United States Patent
Liang et al.

(10) Patent No.: US 6,188,643 B1
(45) Date of Patent: Feb. 13, 2001

(54) METHOD AND APPARATUS FOR INSPECTING WELL BORE CASING

(75) Inventors: Kenneth K. Liang, New Milford, CT (US); Philippe G. Herve, St. Andre des Eaux (FR); Fred E. Stanke, West Redding, CT (US)

(73) Assignee: Schlumberger Technology Corporation, Ridgefield, CT (US)

(*) Notice: Under 35 U.S.C. 154(b), the term of this patent shall be extended for 0 days.

(21) Appl. No.: 08/322,919

(22) Filed: Oct. 13, 1994

(51) Int. Cl.$^7$ .............................. G01V 1/40; G01N 29/04; G01B 17/02
(52) U.S. Cl. ............................ 367/29; 367/26; 367/30; 367/35; 364/422
(58) Field of Search ................................ 367/26, 28, 29, 367/30, 35; 364/422; 181/105; 73/622

(56) References Cited

U.S. PATENT DOCUMENTS

| | | | |
|---|---|---|---|
| 3,929,006 | * 12/1975 | Boggs et al. | 73/67.8 |
| 4,160,385 | * 7/1979 | Gromlich et al. | 73/622 |
| 4,799,177 | * 1/1989 | Sarr | 364/563 |
| 4,893,286 | * 1/1990 | Cobb | 367/87 |
| 4,953,147 | * 8/1990 | Coff | 367/35 |
| 5,072,388 | * 12/1991 | O'Sullivan et al. | 364/422 |
| 5,237,643 | * 8/1993 | Kawabata et al. | 395/51 |

* cited by examiner

Primary Examiner—Nelson Moskowitz
(74) Attorney, Agent, or Firm—Martin M. Novack; Leonard W. Pojunas; Brigitte L. Jeffery

(57) ABSTRACT

An improved technique for determining the thickness of a member, especially pipe such as fluid-filled casing in an earth borehole, includes the following steps: directing a pulse of ultrasonic energy toward the inner surface of the pipe, and receiving and storing, as a function of time, signals representative of ultrasonic energy reflected from the inner surface of the pipe; determining, from the stored signals, the arrival time of the initial echo from the inner surface; determining, from the stored signals, the arrival time and the amplitude of a first candidate initial echo from the outer surface of the pipe; performing a reverse search on the stored signals to determine, from stored signals at times earlier than the arrival time of the first candidate, the arrival time and amplitude of a second candidate initial echo from the outer surface; comparing amplitudes of the first and second candidates, and selecting, based on the comparison, one of the first and second candidates as the actual outer surface echo; and determining the thickness of the pipe from the arrival time of the actual outer surface echo and the arrival time of the inner surface echo. Using this technique, the earlier arriving candidate can be properly identified as the actual outer surface echo, even when the later arriving candidate has a greater amplitude.

18 Claims, 5 Drawing Sheets

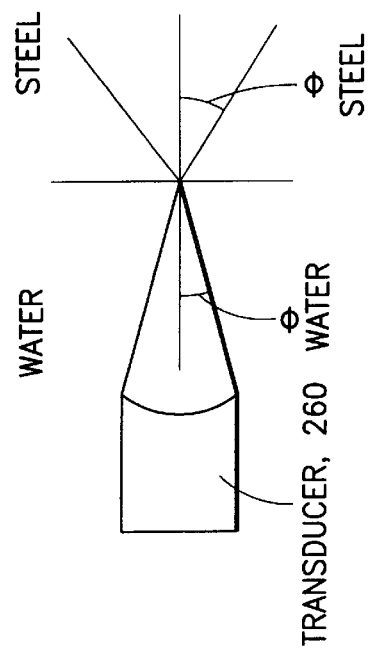
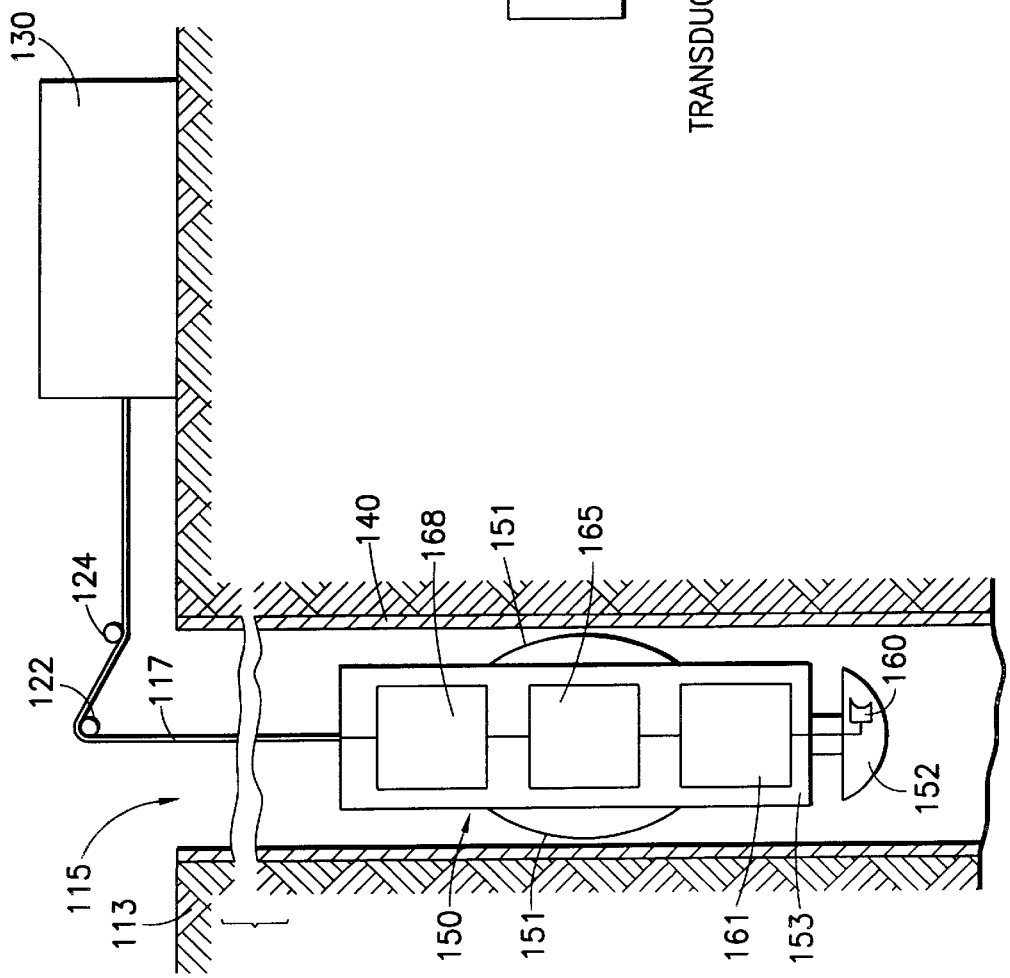
FIG. 2
FIG. 1

METHOD AND APPARATUS FOR INSPECTING WELL BORE CASING

FIELD OF THE INVENTION

This invention relates to ultrasonic inspection and, more particularly, to a method and apparatus for ultrasonic inspection of pipe, such as transportation pipelines, utility plumbing, and, especially, metal casing in a well bore.

BACKGROUND OF THE INVENTION

Metal casing is commonly used in oil well boreholes, and it is desirable to periodically determine the physical condition and integrity of the casing, which is subject to deterioration, such as from corrosion. Ultrasonic inspection of casing and other piping is known in the art. One type of such equipment is utilized by the assignee of the present application, Schlumberger Technology Corporation, and is called the Ultrasonic Imager ("USI"—trademark of Schlumberger Technology Corporation). In an example of a borehole ultrasonic inspection equipment, a tool is lowered in a cased borehole and has a rotating acoustic transducer that emits a pulse of ultrasonic energy toward the casing. As shown, for example, in U.S. Pat. No. 5,274,604, which relates to characterizing interfaces formed between various materials in a cased borehole, the transducer can be focused. The echoes from the casing are received by the same transducer, and converted to electrical signals by the transducer. The signals can be processed to obtain characteristics of the casing, including its inner radius, reflectivity, and thickness.

An accurate determination of the casing inner radius can be obtained by processing the received echoes using a "center of energy" ("COE") technique, as described, for example, in Stanke and Liang, "Profiling High-Angle Surfaces With Focused Transducers And Time-of-Flight Measurements", IEEE 1990 Ultrasonics Symposium, 1990. However, existing techniques of casing thickness determination could stand improvement. The reflected echoes from the casing outer surface tend to be small compared to those from the inner surface. Also, the consistent detection of the arrival of echoes from the casing outer surface can be difficult. When the ultrasound energy first impinges on the casing inner surface, both compressional and shear ultrasonic components propagate toward the casing outer surface, and when some of the energy from these components reflect off the casing outer surface, both compressional and shear components are again generated and propagate back toward the casing inner surface, with energy therefrom being ultimately received by the transducer. Compressional (p) components have a substantially higher velocity than shear (s) components. In general, the casing thickness would be ideally determined from the initial p-p echo [the forward and reflected compressional components, which arrive first]. The p-s and s-p components arrive at the transducer at about the same time and can have a cumulatively greater amplitude than the somewhat earlier p-p arrival. Although the p-p arrival can usually be distinguished from the later arriving p-S/s-p arrivals, the p-p can also be confused with the ringing tail end of the main (first) reflection from casing inner surface. This is particularly true for thin casings and for reflections from casing outer surface pits and other deformities.

Further limitations of existing ultrasonic casing inspection systems relate to their ability to obtain relatively high resolution measurements of casing characteristics at a relatively high rate, and to communicate sufficient information to the earth's surface on a limited bandwidth communications channel.

It is among the objects of the present invention to provide solutions to the above-indicated problems and limitations of the prior art, and to generally improve ultrasonic inspection of casing and other piping.

SUMMARY OF THE INVENTION

In accordance with one feature of the invention, an improved technique is provided for determining the thickness of a member, especially pipe such as fluid-filled casing in an earth borehole. An embodiment of the method includes the following steps: directing a pulse of ultrasonic energy toward the inner surface of the pipe, and receiving and storing, as a function of time, signals representative of ultrasonic energy reflected from the inner surface of the pipe; determining, from the stored signals, the arrival time of the initial echo from the inner surface; determining, from the stored signals, the arrival time and the amplitude of a first candidate initial echo from the outer surface of the pipe; performing a reverse search on the stored signals to determine, from stored signals at times earlier than the arrival time of the first candidate, the arrival time and the amplitude of a second candidate initial echo from the outer surface; comparing amplitudes of the first and second candidates, and selecting, based on the comparison, one of the first and second candidates as the actual outer surface echo; and determining the thickness of the pipe from the arrival time of the actual outer surface echo and the arrival time of the inner surface echo. Using the technique hereof, the earlier arriving candidate can be properly identified as the actual outer surface echo, even when the later arriving candidate has a greater amplitude.

In accordance with a further feature of the invention, weakly focused ultrasound beam pulses are focused on the inner surface of fluid-containing casing in an earth borehole to obtain improved spatial resolution and measurement accuracy in the determination of casing thickness. Preferably, the convergence angle of the beam should not include significant incident energy above the compressional critical angle for the inner casing surface, even when transducer position or casing eccentering or other factors result in focusing that deviates somewhat from the inner surface of the casing. In accordance with an embodiment of the invention there is provided an ultrasonic transducer assembly for transmitting ultrasonic energy through the liquid to the casing and for receiving ultrasonic energy representative of echoes reflected from the casing; the ultrasonic transducer assembly including means for focusing the transmitted ultrasonic energy at the inner surface of the casing, the ultrasound being focused with a focusing cone of f/3 or higher f-number for a typical steel casing in a typical borehole (e.g. about 5 to 13 inch inner diameter); and means for determining the casing thickness from the received echoes.

A further feature of the invention is that casing parameters, particularly inner radius and thickness, can be computed downhole with relatively high spatial resolution, and transmitted to surface equipment for display uphole in real time.

Further features and advantages of the invention will become more readily apparent from the following detailed description when taken in conjunction with the accompanying drawings.

BRIEF DESCRIPTION OF THE DRAWINGS

FIG. 1 is a schematic diagram, partially in block form, of an apparatus in accordance with an embodiment of the invention and which can be used to practice an embodiment of the method of the invention.

FIG. 2 illustrates a beam focused by a curved transducer at the inner surface of a liquid-containing casing.

DETAILED DESCRIPTION

Figure 3:
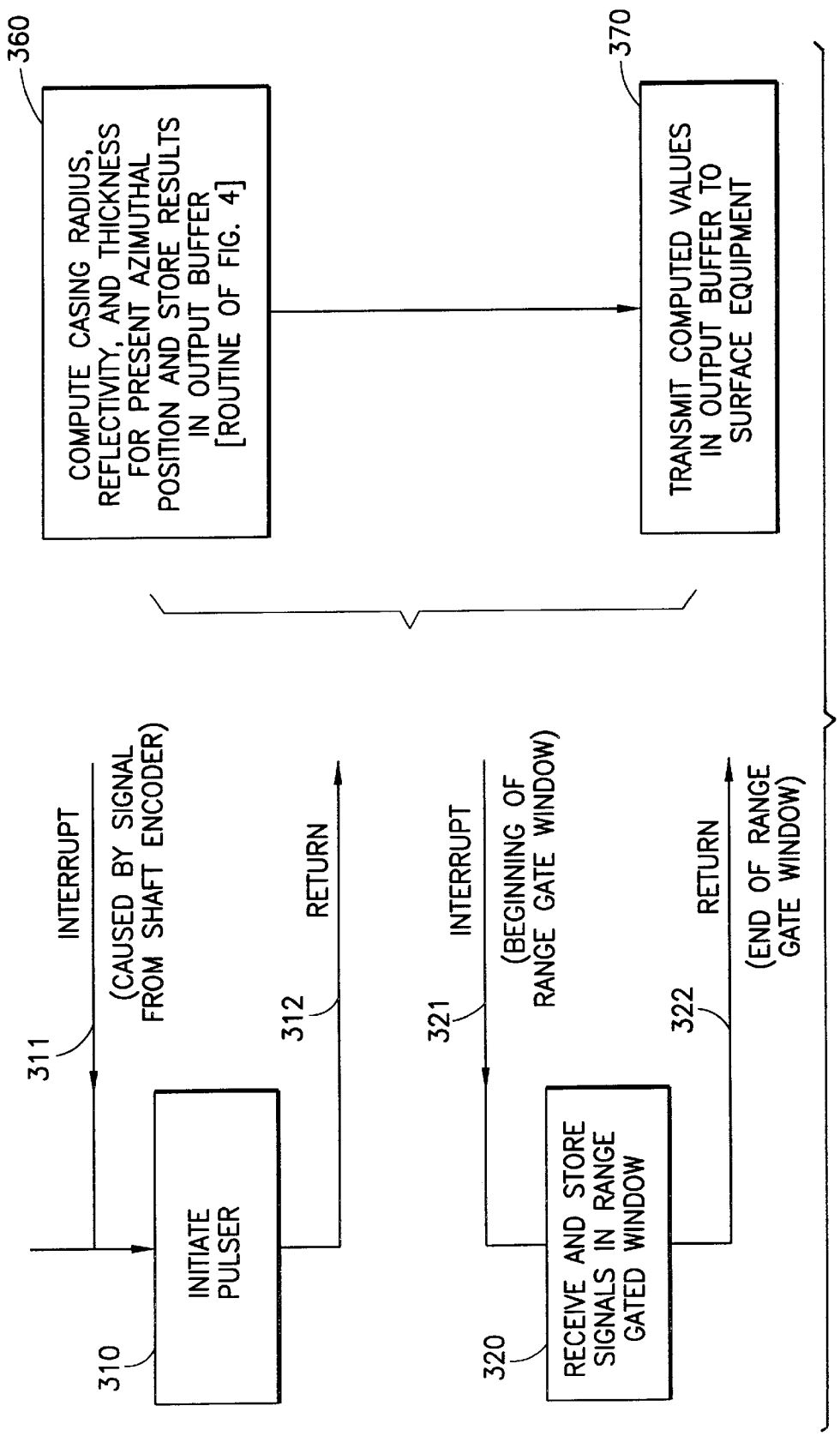
FIG. 3 is a flow diagram of a routine for controlling a downhole processor to perform control of downhole functions in accordance with an embodiment of the invention.

Referring to FIG. 1, there is shown an embodiment of an apparatus in accordance with an embodiment of the invention, and which can be used to practice an embodiment of the method of the invention. An investigating tool or sonde 150 can be lowered and raised in a borehole 115 in earth formations 113 on an armored multiconductor cable 117 which passes over sheave wheel 122 and is controlled by surface equipment 130. Cable displacement, and therefore tool depth, is measured by a depth gauge 124. Casing or pipe 140 is set in the borehole, and there may typically be cement (not shown) between the casing and the earth formations, a primary purpose of the cement being to prevent migration of fluids between water and hydrocarbon bearing zones in a production zone.

The device 150 is provided with centralizers, represented at 151, and has a rotatable subassembly or "sub", 152, that is driven by a mot or assembly (not shown) in the housing 153 of device 150, which drives the sub 152 via a rotating shaft and a rotating seal (also not shown). Reference can be made to U.S. Pat. No. 5,274,604, and to the publication of the assignee hereof "Ultrasonic Imager USI", Schlumberger Testing & Production Services, 1991.

The rotatable sub 152 includes a focused transducer that directs pulse of ultrasound energy toward the casing and receives reflected echoes. In general, focusing reduces the sensitivity of the return echo to misalignment of the transducer with respect to the reflection surface. The transducer is coupled to electronics in the sonde housing via rotating electrical connections (not shown). In the FIG. 1 embodiment, the electronics in the tool housing 160 includes blocks designated 161, 165 and 168. The block 161 represents the pulser/receiver, signal conditioning for the received signal, and digitization of the received signal. The block 165 includes a digital microprocessor, for example a model ADSP-2100 of Analog Devices Corp., and associated memory, timing, and input/output circuitry, which collectively comprise the downhole processor subsystem. The block 168 includes telemetry circuitry for communication with telemetry circuitry in the surface equipment 130, which can also typically include an uphole processor subsystem. The block 168 can also include its own processor and a data compression encoder for maximizing the efficiency of data transmission for the available bandwidth in cable 117. A suitable decoder, for decoding compressed data, can be provided in the surface equipment circuitry.

In operation, the processor subsystem in block 165 controls the pulser/receiver in block 160 to generate pulser signals to the transducer 160, e.g. at 1500 pulses per second. For a sub 152 rotational rate of 7.5 revolutions per second, this provides an investigating pulse every 1.8 degrees of rotation. The sub rotational angle is continuously available from a shaft encoder (not shown). After pulse transmission, the pulser/receiver is switched to receive mode, and the received echo-representative signals (which can be range gated, as is known in the art) are received, filtered, and sampled and digitized using an analog-to-digital converter in circuitry 161. The digitized waveform is stored, under control of the processor, in a buffer memory, which is part of the downhole processor subsystem, as a function of time elapsed since pulse transmission. The downhole processor subsystem, when programmed in accordance with the routines described hereinbelow, is operative to determine characteristics of the casing, and to cause transmission, via block 168, of these determined characteristics to the earth's surface in "real time"; viz., as the casing is being scanned, the information concerning the casing characteristics is determined and transmitted at a rate that approximates the scanning rate. In an embodiment hereof, this information is displayed on a display at the surface equipment (such as a monitor—not separately shown) in real time.

The use of focusing provides self-alignment of the acoustic beam in pulse-echo operation and reduces sensitivity of the amplitude of the reflected signal to deviation from normal incidence for the transducer. In accordance with an embodiment of the invention, the focusing of the acoustic transducer is tailored to control the spreading of the ultrasound beam inside the casing wall, which directly affects the spatial resolution and accuracy of the thickness measurement. Consider the case of focusing an incident acoustic beam at a water/steel interface. Due to the 1:4 mismatch in compressional velocity, the divergence angle of the emergent beam in steel is much larger than the convergence angle of the incident beam in water. [See the illustration of FIG. 2, which shows a beam focused by a curved transducer 260, and focusing at the water/steel interface.] With the total emitted energy kept constant, increasing the focusing or equivalently the convergence angle of the incident beam will make the diverging beam in steel diverge at an accelerated rate, resulting in a reduction of the reflection echo from the outer surface of the casing due to geometric spreading and specular reflection loss. Hence the amplitude ratio of the inner versus outer surface echoes would be adversely increased. Increasing the proportion of off-normal incident energy encourages shear wave excitation that gives rise to later arrival signals, which could become comparable in amplitude to the compressional arrival. As noted in the background portion hereof, in thin casings, where the various arrival signals are clustered closely in time, the external echo can become difficult to identify as it is obscured by the residual ringing in the tail of the inner surface echo and is about the same amplitude as the later arrival signals due to shear excitation. Excessive focusing can therefore be disadvantageous for the determination of casing thickness. Therefore, in accordance with a feature of the invention, a relatively weak focusing of the transducer is utilized; viz., for a typical water-filled steel casing (5 to 13 inch inner diameter, with about 7 inch inner diameter being most typical), the acoustic transducer is focused to a cone having an f-number of f/3 or higher. This relatively weak focusing also allows a large depth of field to accommodate badly deformed casing where severe tool eccentering is to be expected.

Applicant has determined experimentally that focusing on the inner surface of the casing (especially in the case of steel casing) gives the optimal spatial resolution and measurement accuracy for internal radius and casing thickness. The inner surface echo tends to be the dominant signal in the reflection waveform and it is desirable to keep its pulse shape as compact in time as possible so that it does not interfere with the outer surface echo. Placing the focal plane of the transducer at the inner surface of the casing yields the most compact reflection pulse because the reflector is by definition equidistant from every point on the face of the focused transducer. Defocusing will upset this spatial relationship and the received inner surface echo will spread in time, hence reducing the quiet time interval between the inner and outer surface echoes and making thickness measurement more difficult, particularly in thin casing. Therefore, it is desirable to place the focal plane of transducer as close to the inner surface of the casing as possible.

Referring to FIG. 3, there is shown a flow diagram of a routine for controlling the downhole processor subsystem in block 165 to perform downhole functions hereof. The block 310 represents initiating of transmission of a pulse of ultrasound energy from the pulser in circuit 161, which energizes transducer 160. An interrupt signal, represented by arrow 311, can be derived from the shaft encoder so that investigating pulses are transmitted after rotation of sub 152 of a predetermined number of degrees; 1.8 degrees in the present embodiment. The block 320 represents the receiving and storing of ultrasonic energy reflected from the casing. As is known in the art, range gating can be used to store only received signals within a particular time window that depends on the generally known approximate geometry of the casing. Thus, for example, for a casing of a certain nominal diameter and thickness, and with knowledge of the speed of sound in the fluid and solid media, one can compute, with respect to the pulse transmission time, the approximate time window during which the pertinent echoes are expected to be received, and received echoes are processed and stored only during this "range gate" period of time. In the illustrated embodiment, the primary functions of pulser initiation and echo system reception work on an "interrupt" scheme. The functions of initiating the pulser, and of receiving and storing signals in the range gated window, have highest priority.

A routine is provided for computing casing radius, reflectivity, and thickness, for the present rotational position and storing the results in an output buffer. This routine is represented by the block 360, and described in further detail in conjunction with the routine of FIG. 4. The control of transmitting the computed values in the output buffer to the surface equipment (using the telemetry equipment of block 168 of FIG. 1) is represented by block 370. In the routine of FIG. 3 these functions of blocks 360, 370 have secondary priority.

In operation, when a signal from the shaft encoder indicates that the pulser should be initiated, the performance of the subroutine of blocks 360 and 370 is interrupted (arrow 311), and the pulser is initiated, as represented by the block 310. The subroutine of blocks 360 and 370 is then returned to (as represented by the arrow 312), and continued until the next interrupt (arrow 321) which is generated at the beginning of the range gate window. Signals from the transducer 160 representative of energy in the received echoes are received and stored, as represented by the block 320. This continues until the end of the range gate window, whereupon return is implemented (arrow 322) to the subroutine of blocks 360 and 370, for continuation of computation of the casing parameters. The next interrupt (arrow 311), caused by a signal from the shaft encoder, starts the sequence again. The processing is performed fast enough to obtain real time display of casing thickness uphole for at least 100 transducer firings (pulses) per rotation (3.6 degree azimuthal angular spacing) at a transducer rotation rate of 5 revolutions per second (i.e., a rate of at 500 interrogating pulses per second).

Preferably, and in an example of the invention, uphole real time display of casing thickness is implemented at 200 transducer pulses per rotation (1.8 degree azimuthal angular spacing) at a transducer rotation rate of 7.5 revolutions per second (i.e., a rate of 1500 interrogating pulses per second).

In an embodiment of the invention, the control of the function of transmitting the computed values in the output buffer to the surface equipment is controlled by a separate processor. Interrogations from the uphole equipment can also be used for controlling data transfer.

Figure 4A:
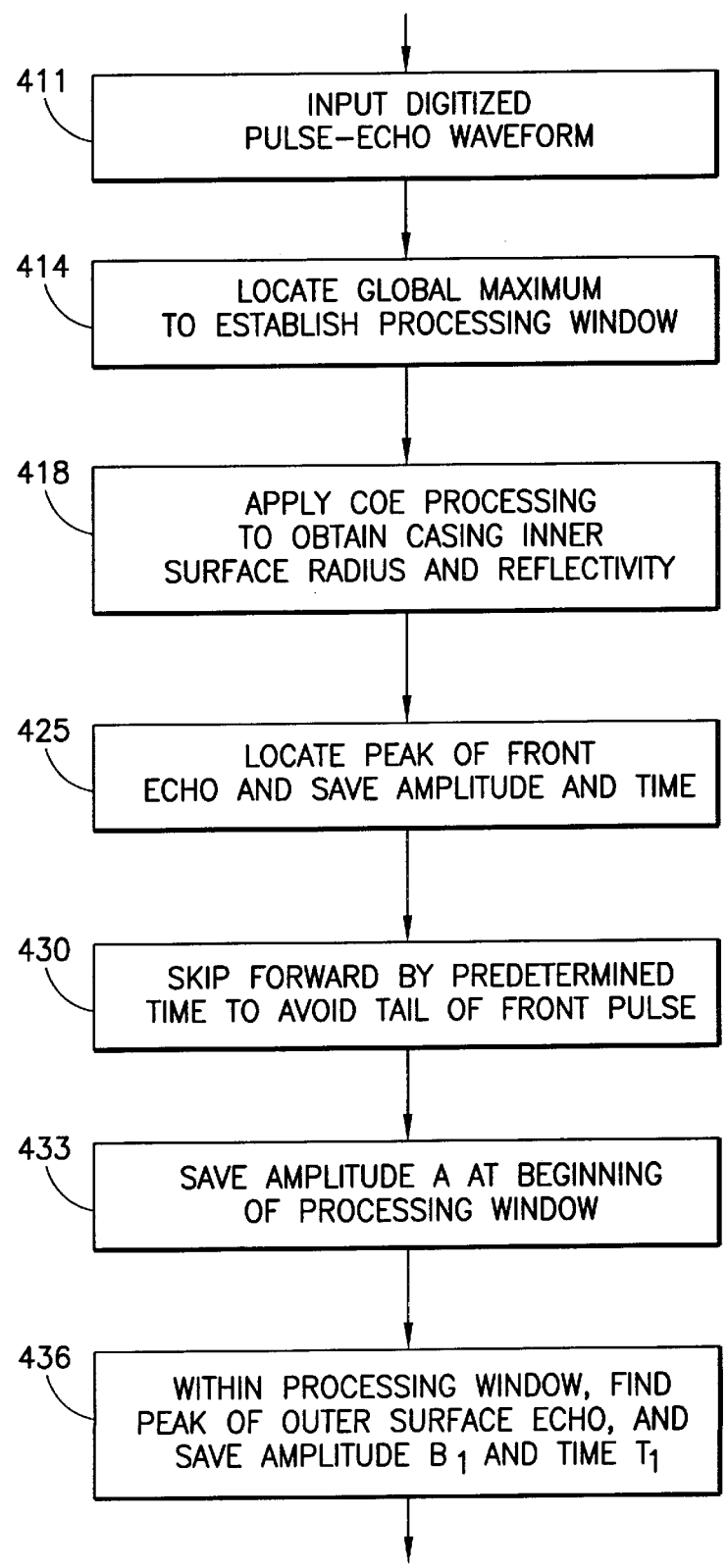
FIG. 4, which includes FIG. 4A and FIG. 4B placed one below another, is a routine for determining casing inner radius and thickness in accordance with an embodiment of the invention.
Figure 4B:
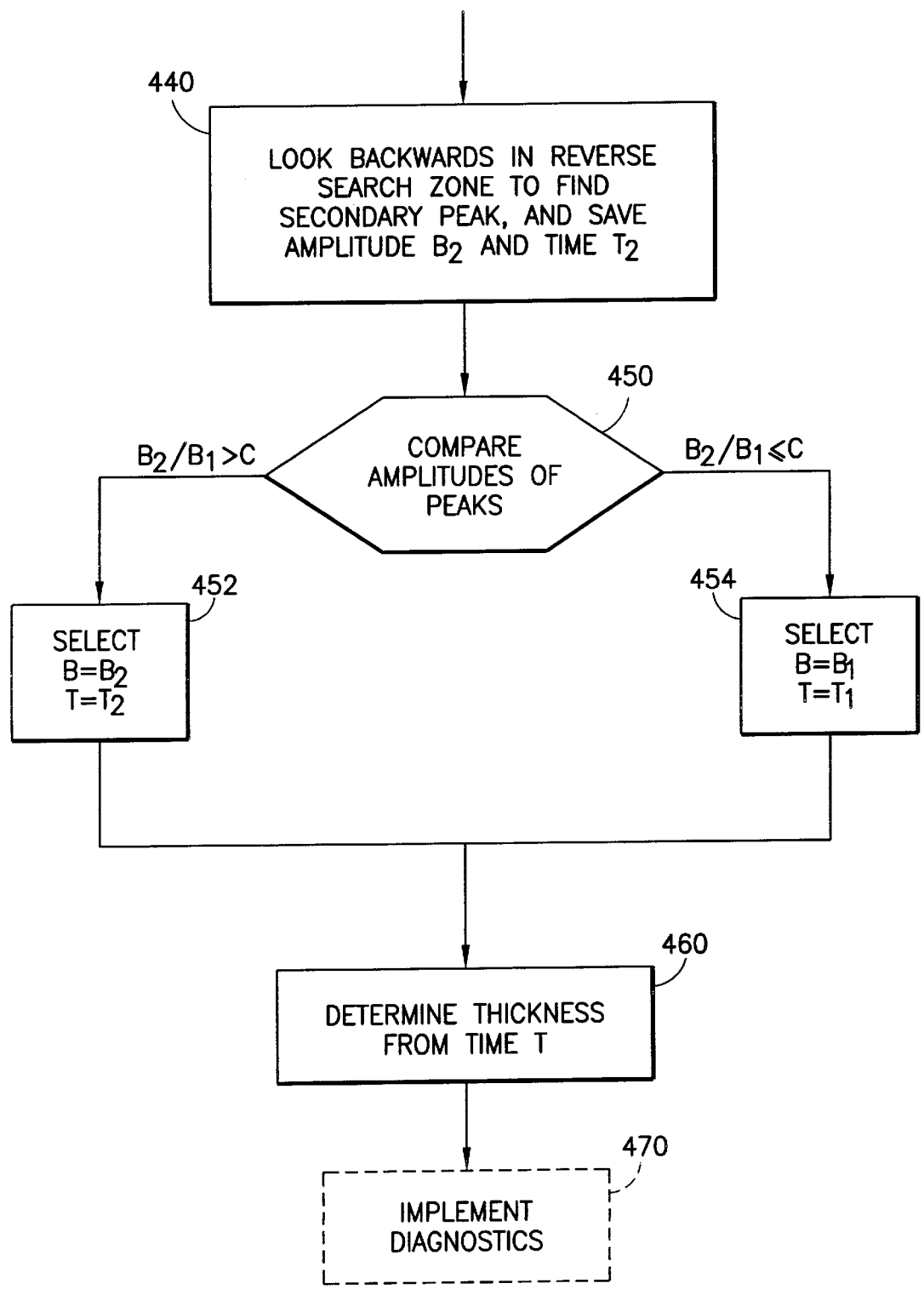
Figure 5:
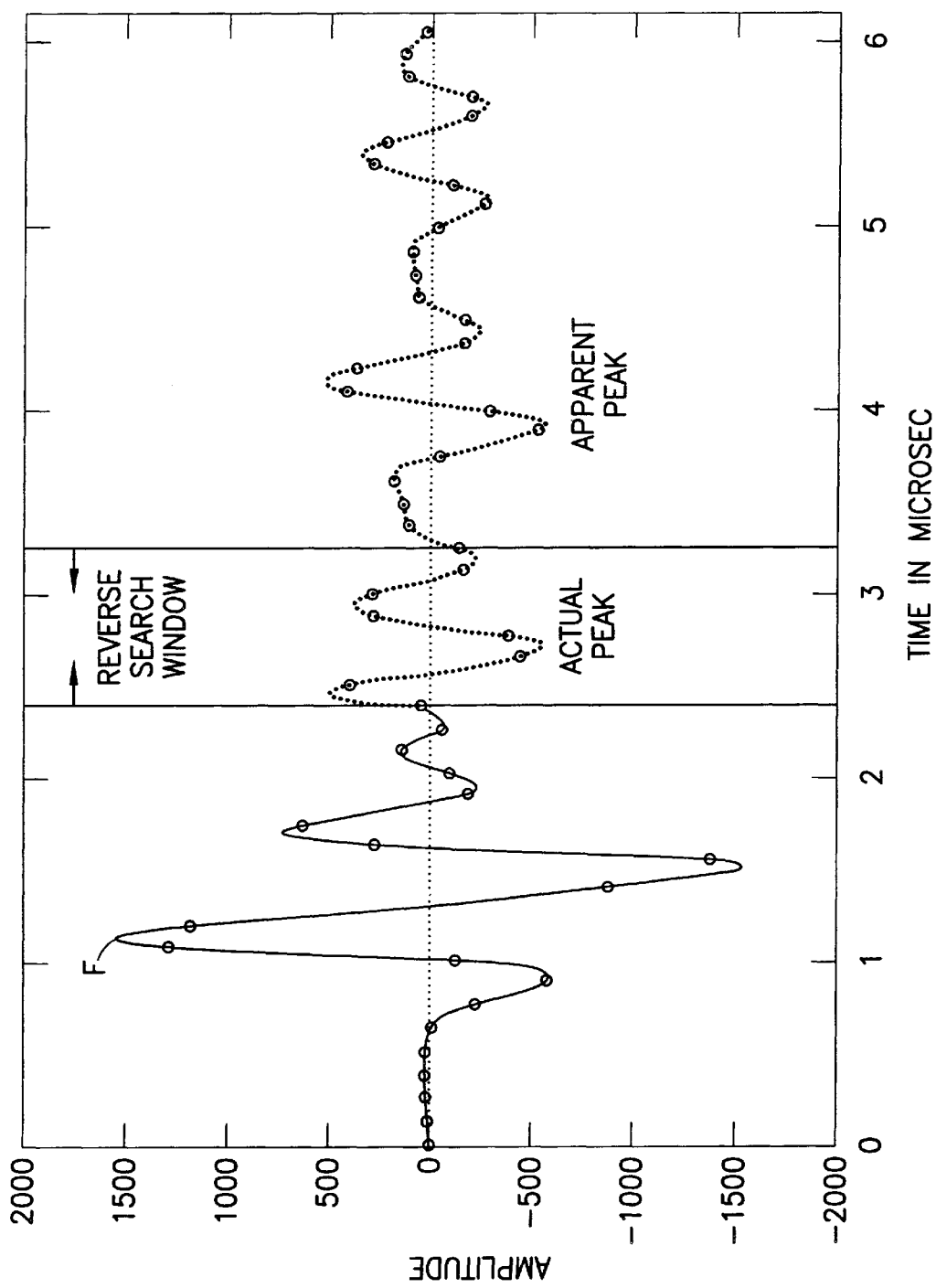
FIG. 5 illustrates a waveform of the type that is obtained and processed in accordance with an embodiment of the invention.

Referring to FIG. 4, there is shown a flow diagram of a routine for controlling the downhole processor subsystem (in block 165 of FIG. 1) in accordance with a feature of the invention to obtain accurate determination of characteristics of the casing. The block 411 represents the inputting of digitized pulse-echo waveform, as received from the analog-to-digital converter in circuitry 161. The digitized wave form is stored in memory, as a function of time (e.g. time from pulse transmission), and is available for the subsequent processing. Reference can be made to FIG. 5, which shows the shape of a typical waveform, but with the signal magnitude magnified by a factor of five where the waveform is shown in dotted line. The block 414 represents locating of a global maximum to establish a processing window for the first stage processing, whereby the casing inner surface radius and reflectivity are determined by a center of energy (COE) technique. The global maximum is the highest amplitude point within a general time frame which is known approximately from the nominal casing radius and the velocity of ultrasound in the fluid in the casing [see point F in the waveform of FIG. 5]. The block 418 represents application of a COE processing subroutine to obtain the casing inner surface radius and reflectivity. This particular subroutine is not, per se, an inventive aspect hereof, and reference can be made, for example, to the detailed description set forth in Stanke & Liang, "Profiling High-Angle Surfaces With Focused Transducers And Time-Of-Flight Measurements", IEEE 1990 Ultrasonics Symposium, 1990. The amplitude F and time $T_0$ of the peak of the front echo are saved, as represented by the block 425. [Since the pulse transmitted by the transducer is not a perfect impulse, the transmission medium is not ideal, the reflective surfaces are not uniform, and noise is present, the exact wavefront arrival times and echo times cannot be exactly pinpointed on a received waveform. Therefore, a practical objective in determination of thickness is to consistently identify the same echo-representative reference times in the signal waveforms.] The block 430 is then entered, this block representing a skipping forward (from the time reference of the peak) by a predetermined time to avoid the ringy tail of the front pulse; that is, to avoid ringing vibrations that follow the main return from the casing inner surface. The predetermined time may be, for example, 1 microsecond, and the thickness processing window, for this example, is a time window of 3.7 microseconds. The amplitude A at the beginning of the processing window is saved, as represented by the block 433. Next, within the processing window, the peak of the back (outer surface) echo is located, and its amplitude ($B_1$) and time ($T_1$) are saved, this function being represented by the block 436. This initial determination of the primary candidate back echo peak is taken to be the largest amplitude peak within the processing window that is of opposite polarity to that of the front echo peak. The block 440 is then entered, this block representing a search backwards in time, in a reverse search zone (which, if desired, can be initiated from a specified time prior to the initially determined peak), to find a secondary candidate back echo peak of the same polarity as the primary candidate back echo peak. The amplitude and time of the peak being saved as $B_2$ and $T_2$, respectively. A comparison is then made (decision block 450) of the amplitudes of the peaks $B_1$ and $B_2$. If $B_2$ is more than a predetermined fraction (C) of $B_1$, then $B_2$ is selected (block 452) as being the amplitude of the echo peak from the outer casing surface (called B) and $T_2$ (the arrival time of that peak) is selected as the arrival time (called T). Conversely, if $B_2$ is equal to or less than the predetermined fraction (C) of $B_1$, then B is selected (block 454) to be the peak $B_1$ and T is selected as the time $T_1$. In an example hereof, C is 0.7. The block 460 is then entered, this block representing the determination of casing thickness from the time T. This can be determined as the product of the transit time in the casing ($T-T_0$) and the velocity of ultrasound in the casing material (typically, steel) divided by two.

Because the ultrasound beam is focused, the so-called "effective slowness" (which is related to the different path lengths in different parts of the focused beam) in the propagation medium is reduced. The reduced slowness (increased velocity) can be calculated based on the focusing characteristics of the transducer. The corrected velocity (see Stanke and Liang, "Profiling High-Angle Surfaces With Focused Transducers And Time-Of-Flight Measurements", IEEE 1990 Symposium, 1990.) can be calculated based on the focusing characteristics of the transducer. The corrected velocity can be used in determination of the inner radius and casing thickness.

An optional diagnostics routine can be implemented, as represented by the block 470. Among the diagnostic functions that can be implemented are the following: (1) Tool eccentering in unusual casing conditions, or simply operator error in setting the range gate delay, can cause the data capture window to miss the reflection waveform partially or completely. Such a condition can be detected and flagged. (2) The COE location and the global maximum location are not necessarily coincident due to asymmetry of the waveform, but they should be reasonably close to each other. When the COE calculation and positive peak location are grossly mismatched, the condition can be flagged. (3) The amplitude of the outer echo relative to the global maximum can be checked and flagged if outside a predetermined ratio. (4) The front echo tends to spread in time when significant roughness is encountered on the inner surface of the casing. If the amplitude of the first time sample of the thickness processing window exceeds some threshold percentage of the global maximum of the inner echo, the condition can be flagged to indicate front pulse spreading.

The invention has been described with reference to a particular preferred embodiment, but variations within the spirit and scope of the invention will occur to those skilled in the art. For example, it will be understood that the thickness determining technique hereof can be used for inspection of other media.

What is claimed is:

1. A method for determining the thickness of a generally cylindrical member, comprising the steps of:

directing a pulse of ultrasonic energy toward the cylindrical member, and receiving and storing, as a function of time, signals representative of ultrasonic energy reflected from the member as a result of the directed pulse;

determining, from said stored signals, the arrival time of the initial echo from the front surface of the member also resulting from the directed pulse;

determining, from said stored signals, the arrival time and the amplitude of a first candidate initial echo from the back surface of said member, the first candidate initial echo also resulting from the directed pulse;

performing a reverse search on said stored signals to determine, from stored signals also resulting from the directed pulse and at times earlier than the arrival time of said first candidate, the arrival time and the amplitude of a second candidate initial echo from said back surface of the member, the second candidate initial echo also resulting from the directed pulse;

comparing amplitudes of said first and second candidates, and selecting, based on said comparison, one of said first and second candidates as the actual back surface echo; and determining the thickness of said member from the arrival time of the actual back surface echo and the arrival time of the front surface echo.

2. The method as defined by claim 1, wherein said step of determining the arrival time of the initial front surface echo comprises determining the global peak of said stored signals having arrival times within a predetermined time period.

3. The method as defined by claim 2, wherein said first candidate initial echo is determined as the highest amplitude peak of opposite polarity to said global peak.

4. The method as defined by claim 1, wherein said second candidate is selected as the actual back surface echo if it has an amplitude of at least a predetermined fraction of the amplitude of said first candidate.

5. The method as defined by claim 2, wherein said second candidate is selected as the actual back surface echo if it has an amplitude of at least a predetermined fraction of the amplitude of said first candidate.

6. The method as defined by claim 3, wherein said second candidate is selected as the actual back surface echo if it has an amplitude of at least a predetermined fraction of the amplitude of said first candidate.

7. The method as defined by claim 6, wherein said predetermined fraction is about 0.7.

8. A method for determining the thickness of generally cylindrical pipe, comprising the steps of:

directing a pulse of ultrasonic Energy toward the inside of the pipe, and receiving and storing, as a function of time, signals representative of ultrasonic energy reflected from the inner surface of the pipe as a result of the directed pulse;

determining, from said stored signals, the arrival time of the initial echo from said inner surface also as a result of the directed pulse;

determining, from said stored signals, the arrival time and the amplitude of a first candidate initial echo from the outer surface of said pipe, the first candidate initial echo also resulting from the directed pulse;

performing a reverse search on said stored signals to determine, from stored signals also resulting from the directed pulse and at times earlier than the arrival time of said first candidate, the arrival time and the amplitude of a second candidate initial echo from said outer surface, the second candidate initial echo also resulting from the directed pulse;

comparing amplitudes of said first and second candidates, and selecting, based on said comparison, one of said first and second candidates as the actual outer surface echo; and determining the thickness of said pipe from the arrival time of the actual outer surface echo and the arrival time of the inner surface echo.

9. The method as defined by claim 8, wherein said step of determining the arrival time of the initial inner surface echo comprises determining the global peak of said stored signals having arrival times within a predetermined time period.

10. The method as defined by claim 9, wherein said first candidate initial echo is determined as the highest amplitude peak of opposite polarity to said global peak.

11. The method as defined by claim 8, wherein said second candidate is selected as the actual back surface echo if it has an amplitude of at least a predetermined fraction of the amplitude of said first candidate.

12. The method as defined by claim 10, wherein said second candidate is selected as the actual back surface echo if it has an amplitude of at least a predetermined fraction of the amplitude of said first candidate.

13. The method as defined by claim 12, wherein said predetermined fraction is about 0.7.

14. The method as defined by claim 8, wherein said pipe is liquid-containing casing in an earth borehole.

15. The method as defined by claim 12, wherein said pipe is liquid-containing casing in an earth borehole.

16. Apparatus for determining the thickness of generally cylindrical casing in an earth borehole, comprising:

a logging device suspendible in the borehole, said logging device including;

means for directing a pulse of ultrasonic energy toward the inside of the casing, and receiving and storing, as a function of time, signals resulting from the directed pulse and representative of ultrasonic energy reflected from the inner surface of the casing;

means for determining, from said stored signals, the arrival time of the initial echo from said inner surface also resulting from the directed pulse;

means for determining, from said stored signals, the arrival time and the amplitude of a first candidate initial echo from the outer surface of said casing, the first candidate initial echo also resulting from the directed pulse;

means for performing a reverse search on said stored signals to determine, from stored signals also resulting from the directed pulse and at times earlier than the arrival time of said first candidate, the arrival time and the amplitude of a second candidate initial echo from said outer surface, the second candidate initial echo also resulting from the initial pulse;

means for comparing amplitudes of said first and second candidates, and selecting, based on said comparison, one of said first and second candidates as the actual outer surface echo; and means for determining the thickness of said casing from the arrival time of the actual outer surface echo and the arrival time of the inner surface echo.

17. Apparatus as defined by claim 16, wherein said means for determining the arrival time of the initial inner surface echo comprises determining the global peak of said stored signals having arrival times within a predetermined time period.

18. Apparatus as defined by claim 16, further comprising means for transmitting the determined thickness to the earth's surface for real time display of said thickness.

* * * * *